United States Patent
Zhao (10) Patent No.: US 11,093,737 B2
(45) Date of Patent: Aug. 17, 2021

(54) GESTURE RECOGNITION METHOD AND APPARATUS, ELECTRONIC DEVICE, AND COMPUTER-READABLE STORAGE MEDIUM

(71) Applicant: BOE TECHNOLOGY GROUP CO., LTD., Beijing (CN)

(72) Inventor: Jibo Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 82 days.

(21) Appl. No.: 16/445,663

(22) Filed: Jun. 19, 2019

(65) Prior Publication Data

US 2020/0057886 A1 Feb. 20, 2020

(30) Foreign Application Priority Data

Aug. 14, 2018 (CN) .......................... 201810924963.9

(51) Int. Cl.
*G06K 9/00* (2006.01)
*G06T 7/62* (2017.01)
(Continued)

(52) U.S. Cl.
CPC ......... *G06K 9/00355* (2013.01); *G06F 3/017* (2013.01); *G06T 7/20* (2013.01);
(Continued)

(58) Field of Classification Search
None
See application file for complete search history.

(56) References Cited

U.S. PATENT DOCUMENTS 10,096,122 B1* 10/2018 Agrawal .................. G06T 7/11
2011/0216941 A1* 9/2011 Saijo ..................... G06K 9/2018
382/103
(Continued)

FOREIGN PATENT DOCUMENTS

CN 102098526 A 6/2011
CN 103353935 A 10/2013
(Continued)

OTHER PUBLICATIONS

First Office Action for CN Patent Application No. 201810924963.9 dated Jun. 17, 2021.
(Continued)

*Primary Examiner* — Kim Y Vu
*Assistant Examiner* — Nathan J Bloom
(74) *Attorney, Agent, or Firm* — Thomas | Horstemeyer, LLP (57) ABSTRACT

A gesture recognition method includes determining a palm connected domain based on an acquired depth image. The method includes determining a tracking frame corresponding to the palm connected domain. The method includes recognizing a gesture within a region of a to-be-recognized image corresponding to the tracking frame, based on a location of the tracking frame. In this arrangement, a palm connected domain and a tracking frame corresponding to the palm connected domain are acquired, and a gesture is recognized within a region of a to-be-recognized image corresponding to the tracking frame.

18 Claims, 6 Drawing Sheets

(51) Int. Cl.
  *G06T 7/50* (2017.01)
  *G06T 7/70* (2017.01)
  *G06F 3/01* (2006.01)
  *G06T 7/20* (2017.01)

(52) U.S. Cl.
  CPC .................. *G06T 7/50* (2017.01); *G06T 7/62* (2017.01); *G06T 7/70* (2017.01); *G06T 2207/10028* (2013.01); *G06T 2207/20021* (2013.01); *G06T 2207/20024* (2013.01); *G06T 2207/30196* (2013.01)

(56) References Cited

U.S. PATENT DOCUMENTS

| | | | |
|---|---|---|---|
| 2012/0242566 A1* | 9/2012 | Zhang | G06F 3/017 345/156 |
| 2012/0281884 A1* | 11/2012 | Whillock | G06K 9/00201 382/115 |
| 2012/0314031 A1* | 12/2012 | Shotton | G06K 9/6227 348/46 |
| 2013/0336524 A1* | 12/2013 | Zhang | G06K 9/00355 382/103 |
| 2014/0035805 A1* | 2/2014 | Minnen | G06F 3/017 345/156 |
| 2014/0037134 A1* | 2/2014 | Tong | G06K 9/00355 382/103 |
| 2014/0056472 A1* | 2/2014 | Gu | G06K 9/34 382/103 |
| 2015/0026646 A1* | 1/2015 | Ahn | G06F 3/0304 715/863 |
| 2015/0154449 A1* | 6/2015 | Ito | G06K 9/00375 382/103 |
| 2016/0048726 A1* | 2/2016 | Tang | G06K 9/00355 382/103 |
| 2017/0060254 A1* | 3/2017 | Molchanov | G06N 3/0454 |
| 2018/0239957 A1* | 8/2018 | Tang | G06T 7/11 |
| 2018/0350105 A1* | 12/2018 | Taylor | G06K 9/00382 |
| 2019/0392205 A1* | 12/2019 | Tang | G06T 7/246 |
| 2020/0126249 A1* | 4/2020 | Tang | G06T 7/0002 |

FOREIGN PATENT DOCUMENTS

| | | |
|---|---|---|
| CN | 105389827 A | 3/2016 |
| CN | 105787471 A | 7/2016 |
| CN | 107341473 A | 11/2017 |
| CN | 107368778 A | 11/2017 |
| CN | 108256421 A | 7/2018 |

OTHER PUBLICATIONS

Zheng Haibin "Research on Gesture Recognition and its Application: A Thesis in Control Theory and Control Engineering" (Mar. 15, 2017).

Chen et al., "A Survey of Gesture Recognition Based on Depth Image," Journal of Inner Mongolia University (Natural Science Edition) (Jan. 31, 2014).

* cited by examiner

GESTURE RECOGNITION METHOD AND APPARATUS, ELECTRONIC DEVICE, AND COMPUTER-READABLE STORAGE MEDIUM

CROSS-REFERENCE TO RELATED APPLICATIONS

The present application claims priority to Chinese Patent Application No. 201810924963.9 and filed on Aug. 14, 2018, the entire contents of which are incorporated herein by reference.

TECHNICAL FIELD

The present disclosure relates to the field of image processing technologies, and more particularly, to a gesture recognition method and apparatus, an electronic device, and a computer-readable storage medium.

BACKGROUND

At present, the gesture of a user may be recognized by performing a traverse detection on an entire image; and then, a corresponding control operation is performed based on the gesture. However, the calculation amount of traversing the entire image is relatively huge. In the case that gesture recognition needs to traverse multi-frame images, the calculation amount may be significantly increased, which needs a certain time to recognize the gesture of the user, and thus the real-time performance of the gesture recognition is reduced. In addition, when the entire image is traversed, an object similar to a palm causes a false detection in the gesture recognition, which further reduces the accuracy of the gesture recognition.

SUMMARY

The present disclosure provides a gesture recognition method and apparatus, an electronic device, and a computer-readable storage medium.

According to a first aspect of arrangements of the present disclosure, a gesture recognition method is provided. The gesture recognition method includes determining a palm connected domain based on an acquired depth image. The gesture recognition method includes determining a tracking frame corresponding to the palm connected domain. The gesture recognition method includes recognizing a gesture within a region of a to-be-recognized image corresponding to the tracking frame, based on a location of the tracking frame.

In an exemplary arrangement, determining a palm connected domain based on an acquired depth image includes determining a human body connected domain based on the depth image. The depth image includes a plurality of pixels, each of the plurality of pixels corresponding to one depth value, the connected domain including a plurality of depth values. Determining a palm connected domain based on an acquired depth image includes subdividing the plurality of depth values of the human body connected domain into a plurality of depth value groups, and subdividing the human body connected domain based on the plurality of depth value groups to obtain a plurality of sub-connected domains. The plurality of sub-connected domains are in one-to-one correspondence with the plurality of depth value groups. Determining a palm connected domain based on an acquired depth image includes determining a minimum depth value among depth values corresponding to one of the plurality of sub-connected domains as a depth value of the one of the plurality of sub-connected domain, and determining a sub-connected domain having the minimum depth value among the plurality of sub-connected domains as the palm connected domain.

In an exemplary arrangement, determining a human body connected domain based on the depth image includes acquiring M connected domains in the depth image, where the M is a positive integer, the depth image including a plurality of connected domains, each of the plurality of connected domains including a plurality of pixels. Determining a human body connected domain based on the depth image includes determining a minimum depth value of the plurality of pixels as the depth value of the one sub-connected domain, and obtaining N connected domains by filtering some of the M connected domains whose depth value is greater than a first preset distance. The N is a positive integer less than or equal to the M. Determining a human body connected domain based on the depth image includes calculating, for every connected domain among the N connected domains, an actual area of the connected domain based on a depth value, a width value and a height value of each of the plurality of pixels in the connected domain to obtain P connected domains whose said actual area exceeds a first area threshold and is smaller than a second area threshold. The P is a positive integer less than or equal to the N. Determining a human body connected domain based on the depth image includes inputting the P connected domains into a preset first classifier to obtain the human body connected domain.

In an exemplary arrangement, the preset first classifier is obtained by training a standard sample image processed using a standardization method.

The standardization method refers to converting a sample image photographed when a target object is at different distances from a depth camera into a standard sample image. The standard sample image is a matrix of human body information at a distance of two meters from the depth camera, or an information matrix obtained by converting other negative samples at a distance of two meters from the depth camera.

In an exemplary arrangement, calculating an actual area of the connected domain based on a depth value, a width value and a height value of each pixel in the connected domain includes obtaining an actual depth value and an actual height value corresponding to the width value and the height value of each of the plurality of pixels in the connected domain respectively, based on a preset conversion formula. Calculating an actual area of the connected domain includes obtaining an actual area of each of the plurality of pixels in the connected domain based on the actual width value and the actual height value. Calculating an actual area of the connected domain includes determining the actual area of the connected domain according to the actual area of each of the plurality of pixels in the connected domain, based on a preset area formula.

In an exemplary arrangement, subdividing the human body connected domain based on a depth value to obtain a plurality of sub-connected domains includes selecting a reference pixel from the human body connected domain. Subdividing the human body connected domain includes acquiring a pixel adjacent to the reference pixel which has a differential of the depth value between the pixel and the reference pixel not exceeding a first differential. The pixel and the reference pixel belong to a same sub-connected domain. Subdividing the human body connected domain includes by taking the acquired pixel as a new reference pixel, continuing acquiring a pixel belonging to the same sub-connected domain as the new reference pixel. Subdividing the human body connected domain includes treating this block until none of the pixels adjacent to the new reference pixels belongs to the same sub-connected domain, to obtain the sub-connected domain.

In an exemplary arrangement, before determining the sub-connected domain having the minimum depth value among the plurality of sub-connected domains as the palm connected domain, the method further includes acquiring a human body orientation in the depth image, and adjusting the depth value of each of the plurality of sub-connected domains if the human body orientation indicates that the human body does not directly face a depth camera for capturing the to-be-recognized image.

In an exemplary arrangement, determining a tracking frame corresponding to the palm connected domain includes acquiring a minimum circumscribed rectangular frame of the palm connected domain, and using the minimum circumscribed rectangular frame as the tracking frame corresponding to the palm connected domain.

In an exemplary arrangement, recognizing a gesture within a region of a to-be-recognized image corresponding to the tracking frame, based on a location of the tracking frame includes acquiring a human body connected domain corresponding to the depth image having a mapping relationship with respect to the to-be-recognized image, and recognizing the gesture within an overlapping region between the tracking frame and the human body connected domain. In an exemplary arrangement, recognizing the gesture within an overlapping region between the tracking frame and the human body connected domain includes acquiring a first depth value of a target object within the overlapping region and a second depth value of a target object within the overlapping region corresponding to the to-be-recognized image of a previous frame, and recognizing the gesture if a differential between the first depth value and the second depth value is less than a differential threshold; otherwise, switching to other overlapping regions to recognize the gesture.

According to a second aspect of the arrangements of the present disclosure, a gesture recognition apparatus is provided. The gesture recognition apparatus includes a connected domain determining module configured to determine a palm connected domain based on an acquired depth image. The gesture recognition apparatus includes a tracking frame determining module configured to determine a tracking frame corresponding to the palm connected domain. The gesture recognition apparatus includes a gesture recognition module configured to recognize a gesture within a region of a to-be-recognized image corresponding to the tracking frame, based on a location of the tracking frame.

According to a third aspect of the arrangements of the present disclosure, an electronic device is provided. The electronic device includes a processor, a memory, and computer instructions stored on the memory and executable on the processor. When executing the computer instructions, the processor implements the blocks of the method according to the first aspect.

According to a fourth aspect of the arrangements of the present disclosure, there is provided a computer-readable storage medium, which stores computer instructions. When the computer instructions are executed, the blocks of the method according to the first aspect are implemented.

It is to be understood that both the foregoing general description and the following detailed description are exemplary and explanatory only and are not restrictive of the present disclosure.

BRIEF DESCRIPTION OF THE DRAWINGS

The accompanying drawings herein are incorporated in and constitute a part of this specification, illustrate arrangements conforming to the present disclosure and together with the description serve to explain the principles of the present disclosure.

DETAILED DESCRIPTION

Reference will now be made in detail to exemplary arrangements, examples of which are illustrated in the accompanying drawings. When accompanying figures are mentioned in the following descriptions, the same numbers in different drawings represent the same or similar elements, unless otherwise represented. The implementations set forth in the following description of exemplary arrangements do not represent all implementations consistent with the present disclosure. Instead, they are merely examples of apparatus and methods consistent with aspects related to the present disclosure as recited in the appended claims.

In the related technologies, a gesture of a user may be recognized by performing a traverse detection on an entire image; and then, a corresponding control operation is performed based on the gesture. However, the calculation amount of traversing the entire image is relatively huge. In the case that gesture recognition needs to traverse multi-frame images, the calculation amount may be significantly increased, which needs a certain time to recognize the gesture of the user, and thus the real-time performance of the gesture recognition is reduced. In addition, when the entire image is traversed, an object similar to a palm causes a false detection in the gesture recognition, which further reduces the accuracy of the gesture recognition.

Therefore, an arrangement of the present disclosure provides a gesture recognition method. The gesture recognition method is implemented based on a depth image and a to-be-recognized image having a mapping relationship with respect to the depth image. The to-be-recognized image may be a color image or a grayscale image. The depth image and the to-be-recognized image may be captured by a depth camera. One frame of image is photographed each time and is divided into the depth image and the to-be-recognized image. That is, one frame of image is divided into two frames of images. The depth camera may also simultaneously photograph a set of depth image and to-be-recognized image. That is, a manner of acquiring the depth image and the to-be-recognized image is not limited in this arrangement.

An idea of the gesture recognition method is as below. A human body connected domain in the depth image is first acquired based on one frame of depth image, and then a palm connected domain of the depth image and a tracking frame corresponding to the palm connected domain are acquired on the basis of the human body connected domain. In this way, human body positioning and palm positioning may be implemented. Next, a gesture is tracked and recognized in a region of the to-be-recognized image corresponding to the tracking frame.

As can be seen, in this arrangement, a palm connected domain and a tracking frame corresponding to the palm connected domain are acquired, and then a gesture is recognized within a region of a to-be-recognized image corresponding to the tracking frame. In the process of tracking or recognizing the gesture, it is unnecessary to traverse the whole to-be-recognized image, and it is only required to traverse the image within the region corresponding to the tracking frame. Therefore, a traversal scope may be narrowed, and thus data processing amount may be reduced, and real-time performance of gesture recognition may be improved.

The present disclosure provides a gesture recognition method including: determining a palm connected domain based on an acquired depth image; determining that a tracking frame corresponding to the palm connected domain; and recognizing a gesture within a region of a to-be-recognized image corresponding to the tracking frame, based on a location of the tracking frame.

The block of determining a palm connected domain based on an acquired depth image includes: determining a human body connected domain based on the depth image, the human body connected domain including a plurality of pixels, each of the pixels corresponding to one depth value, the connected domain including a plurality of depth values; subdividing the plurality of depth values of the human body connected domain into a plurality of depth value groups, subdividing the human body connected domain based on the plurality of depth value groups to obtain a plurality of sub-connected domains; and the plurality of sub-connected domains being in one-to-one correspondence with the plurality of depth value groups; determining a minimum depth value among depth values corresponding to one sub-connected domain as the depth value of the one sub-connected domain, determining the sub-connected domain having the minimum depth value among the plurality of sub-connected domains as the palm connected domain.

The gesture recognition method provided by an arrangement of the present disclosure will be described in detail below.

Figure 1:
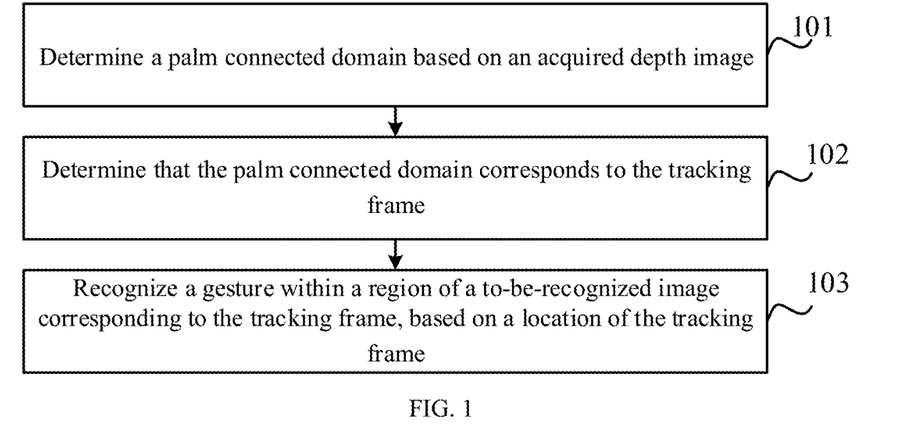
FIG. 1 illustrates a schematic flow diagram of a gesture recognition method according to an arrangement of the present disclosure.

FIG. 1 illustrates a schematic flow diagram of a gesture recognition method according to an arrangement of the present disclosure. This method may be applied to an electronic device such as a server, a personal computer or a terminal, etc. For ease of description, hereinafter the gesture recognition method is described by taking the electronic device as an execution subject. Referring to FIG. 1, a gesture recognition method includes Block 101-Block 103.

In Block 101, a palm connected domain is determined based on an acquired depth image.

In an arrangement, a depth camera may be arranged on the electronic device to capture a depth image. In another arrangement, the electronic device is connected to a device provided with the depth camera, such that the electronic device may receive the depth image.

Figure 2:
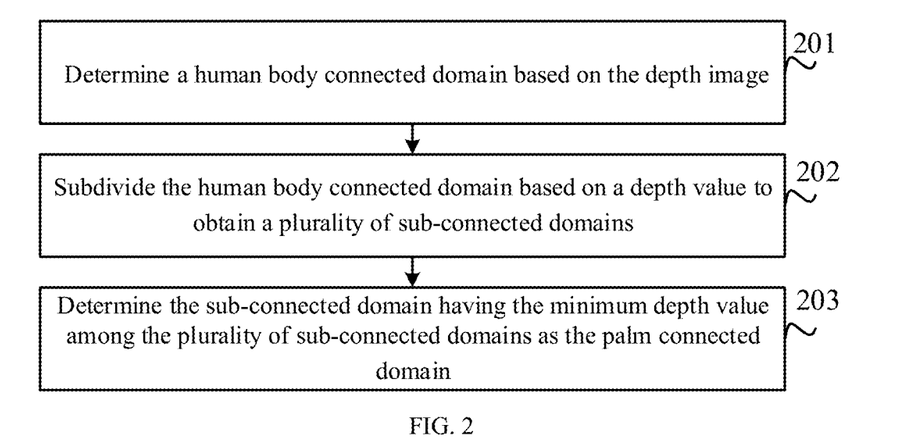
FIG. 2 illustrates a schematic flow diagram of acquiring a palm connected domain according to an arrangement of the present disclosure.

In this arrangement, referring to FIG. 2, the electronic device may determine the palm connected domain according to the depth image, which includes Block 201-Block 203.

In Block 201, a human body connected domain is determined based on the depth image, the human body connected domain including a plurality of pixels, and each of the pixels corresponding to one depth value.

Figure 3:
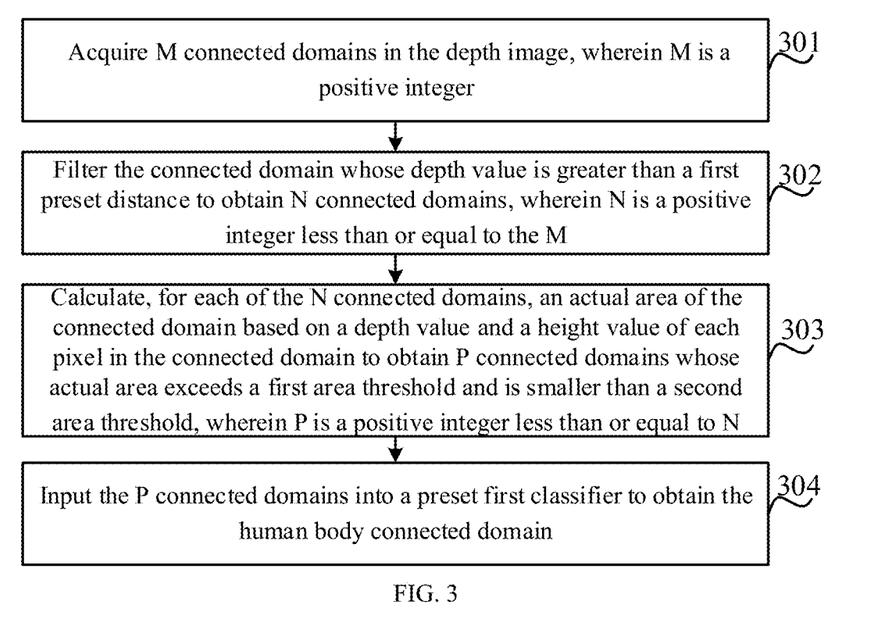
FIG. 3 illustrates a schematic flow diagram of acquiring a human body connected domain according to an arrangement of the present disclosure.

Referring to FIG. 3, the electronic device may obtain M connected domains in the depth image using a connected domain acquisition algorithm in related technologies, wherein M represents a positive integer (corresponding to Block 301). The connected domain acquisition algorithm may adopt an algorithm based on a stroke identifier or an algorithm based on a silhouette markup, for example, a Two-Pass algorithm or a Seed-Filling method. Those skilled in the art may select an appropriate connected domain acquisition algorithm according to a specific scenario, which is not limited herein.

In practical applications, the depth camera has a certain photographing range, and when a target object (i.e., a user) is too far from the depth camera, the user's palm becomes very small. Therefore, in this arrangement, the connected domain whose depth value is greater than a first preset distance (for example, 3 meters) is filtered out, such that N connected domains may be obtained, wherein N represents a positive integer less than or equal to M (corresponding to Block 302).

Next, the electronic device calculates, for each of the N connected domains, an area of the connected domain based on a depth value, a width and a height value of each pixel to obtain P connected domains whose actual area exceeds a first area threshold and is smaller than a second area threshold, wherein P represents a positive integer less than or equal to N (corresponding to Block 303).

The actual area of each connected domain may be calculated out based on an actual width and an actual height of the connected domain, wherein the actual width and the actual height may be obtained using preset conversion formulas as below:

$$\text{width(real)} = \frac{\text{width(pixel)} \times \text{depth}}{\text{ratio}}; \quad (1)$$

$$\text{height(real)} = \frac{\text{height(pixel)} \times \text{depth}}{\text{ratio}}; \quad (2)$$

The actual area of each connected domain may be obtained based on the following formula:

$$\text{area} = \text{height(real)} \times \text{width(real)}; \quad (3)$$

wherein depth represents a depth value of a location where the connected domain is located; ratio represents a preset parameter to be converted into an actual distance, which is related to a specification of the depth camera; width(pixel) and width(real) respectively represent the number of pixels occupied by the width of the connected domain and a real width of the connected domain in the real world, which are measured in mm. height(pixel) and height(real) respectively represent the number of pixels occupied by the height of the connected domain and a real height of the connected domain in the real world, which are measured in mm.

A plurality of connected domains are irregular, and depth values at different locations are not necessarily equal. Therefore, in this arrangement, Formulas (1) to (3) are regarded as the area of one pixel (the width thereof is 1 and the height thereof is 1) in the real world. Since the connected domain is composed of n pixels, the actual area of each connected domain may be calculated out based on a preset conversion formula as below:

$$\text{Area} = \sum_{1}^{n} \frac{(1 \times 1) \times \text{depth}(n)}{\text{ratio}}; \quad (4)$$

wherein 1*1 represents the number of pixels occupied by one pixel, and depth(n) represents a depth value of the pixel n.

Next, the P connected domains are respectively inputted into a preset classifier, and is classified by the classifier to obtain a human body connected domain (corresponding to Block 304).

In this arrangement, the classifier is pre-trained, wherein a training sample is obtained by training a standard sample image processed using a standardization method. The standard sample image includes positive samples of users of different ages and genders. The users of different ages and genders are selected to diversify shapes and sizes of human bodies. Regardless of distance diversity, in this arrangement, all the samples may be processed into a matrix capable of reflecting the actual size of the human body through a standardization method, wherein the standardization method is as follows.

No matter whether the distance between the user and the depth camera is far or near when a sample image photographed, the sample image photographed may be converted into the standard sample image using this standardization method. The standard sample image is a matrix of human body information at a distance of two meters from the depth camera, or an information matrix obtained by converting other negative samples at a distance of two meters from the depth camera. In this way, negative effects on the distance diversity may be eliminated.

For the positive and negative sample images, a center point of a circumscribed rectangle of the positive sample image is extracted, and an image is intercepted within a rectangular frame taking the center point as a center and having a side length of 2 meters. When the side length is 2 meters, the number of pixels occupied by the rectangular frame may be converted, and the negative sample is subjected to the same standardized treatment. Next, a classifier having a binary classification function is trained through traditional methods such as a random forest or a convolutional neural network, etc. It may be distinguished whether a candidate connected domain is a human body region using this classifier.

Figure 4:
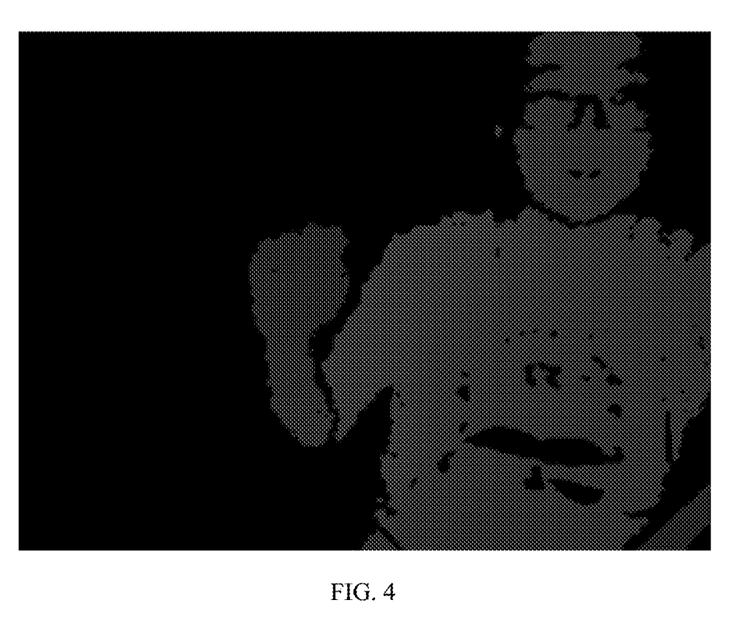
FIG. 4 illustrates a schematic scene diagram of a human body connected domain according to an arrangement of the present disclosure.

In an arrangement, the human body connected domain as shown in FIG. 4 may be obtained through Block 1 and blocks in FIG. 3.

In Block 202, the plurality of depth values of the human body connected domain are subdivided into a plurality of depth value groups, subdividing the human body connected domain is subdivided based on the plurality of depth value groups to obtain a plurality of sub-connected domains; and the plurality of sub-connected domains are in one-to-one correspondence with the plurality of depth value groups, that is, each the sub-connected domain is in correspondence with one depth value.

After the human body connected domain is determined, it is required to track a human body gesture, which may be implemented using the following methods.

In Method I, based on the human body connected domain determined by a previous frame of depth image, a gesture is tracked within a region of this frame and a plurality of subsequent frames of to-be-recognized images corresponding to the human connected domain, thus obtaining the human body gesture. Because the area of a corresponding region of the human body connected domain is much smaller than that of the entire to-be-recognized image, the data calculation amount in the process of recognizing the gesture may be reduced.

In Method II, because each object in the depth image corresponds to a certain depth value, in this arrangement, one differential threshold, i.e., a first differential, may be set to determine whether two pixels belong to the same connected domain. For example, the first differential may be 50 mm.

Figure 5:
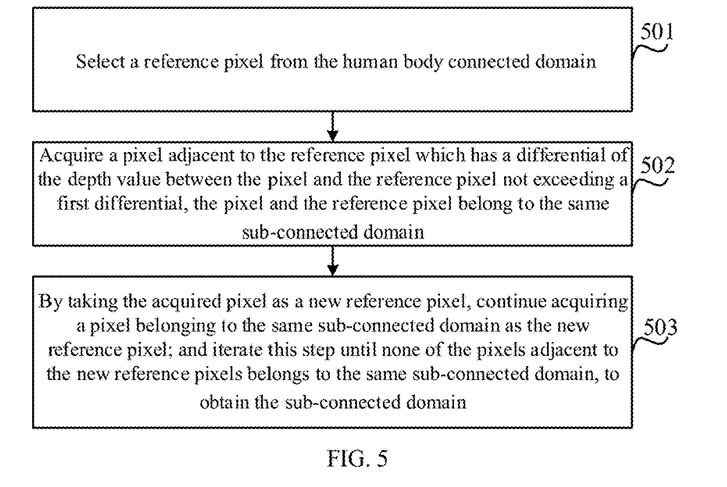
FIG. 5 illustrates a schematic flow diagram of obtaining a plurality of sub-connected domains by subdividing a human body connected domain according to an arrangement of the present disclosure.

Referring to FIG. 5, first, a reference pixel is selected from the human body connected domain (corresponding to Block 501). A selection manner may be a random selection, and pixels not belonging to any sub-connected domain may be sequentially selected from the human body connected domain. Next, a pixel adjacent to the reference pixel which has a differential of the depth value between the pixel and the reference pixel not exceeding a first differential (for example, 50 mm) is acquired, the pixel and the reference pixel belong to the same sub-connected domain (corresponding to Block 502), otherwise, the pixel and the reference pixel do not belong to the same sub-connected domain.

Figure 7:
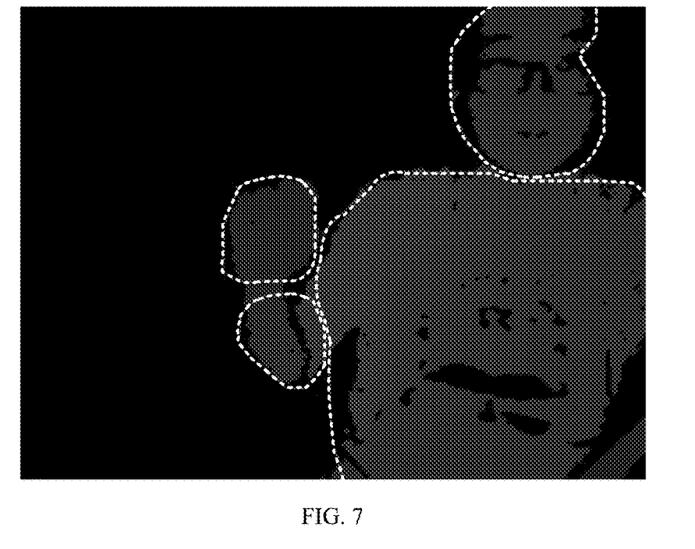
FIG. 7 illustrates a schematic result diagram of a plurality of sub-connected domains corresponding to a human body connected domain according to an arrangement of the present disclosure.

Next, the reference pixel is updated, the acquired pixel (which belongs to the same sub-connected domain as the previous reference pixel) is taken as a new reference pixel, and the pixel that belongs to the same sub-connected domain as the new reference pixel is acquired according to the manner of Block 502. The block of updating the reference pixel is iterated until none of the pixels adjacent to the new reference pixels belongs to the same sub-connected domain, such that the sub-connected domain is obtained (corresponding to Block 503). A plurality of sub-connected domains as shown in FIG. 7 may be obtained after traversing the human body connected domain.

Figure 6:
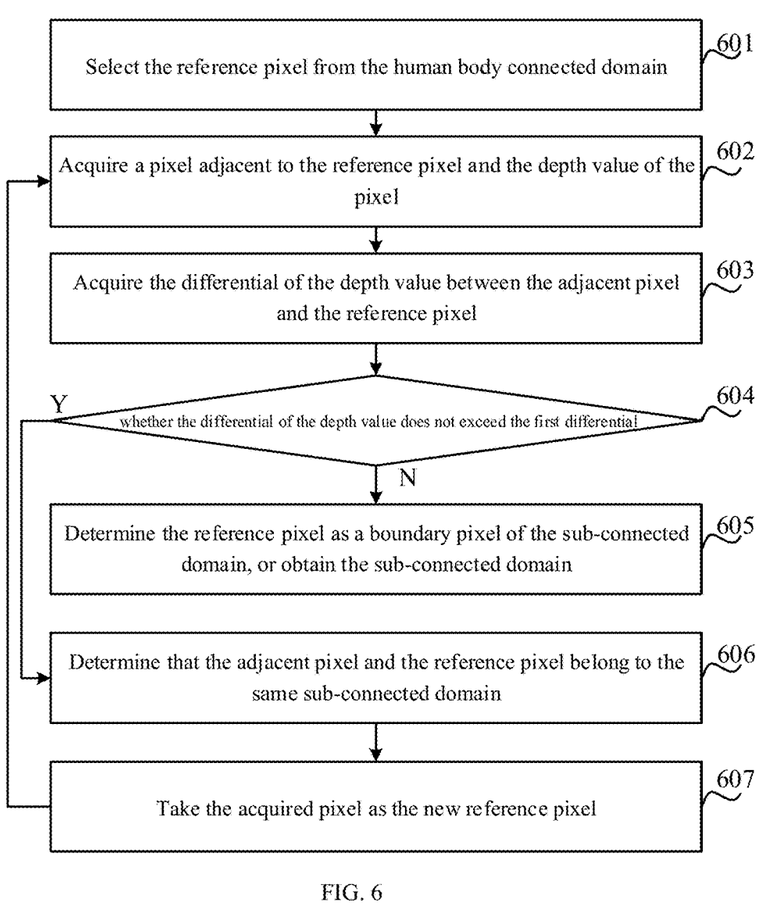
FIG. 6 illustrates a schematic result diagram of obtaining a plurality of sub-connected domains by subdividing a human body connected domain according to an arrangement of the present disclosure.

In Method III, referring to FIG. 6, first, the reference pixel is selected from the human body connected domain (corresponding to Block 601). Next, each pixel adjacent to the reference pixel and the depth value of each pixel are acquired (corresponding to Block 602). Next, the differential of the depth value between the adjacent pixel and the reference pixel is acquired (corresponding to Block 603), and it is determined whether the differential of the depth value does not exceed the first differential (corresponding to Block 604). If not, go to Block 605. That is, it is determined that the reference pixel is a boundary pixel of the sub-connected domain, or the sub-connected domain is obtained. If yes, go to Block 606. That is, the adjacent pixel and the reference pixel belong to the same sub-connected domain. Next, the acquired pixel is taken as the new reference pixel, and execution of Block 602 is continued. Finally, it may be obtained that all the differentials of the depth values of the pixels adjacent to the new reference pixels exceed the first differential, and a sub-connected domain is obtained. A plurality of sub-connected domains as shown in FIG. 7 may be obtained after traversing the human body connected domain.

In Block 203, a minimum depth value among depth values corresponding to one sub-connected domain is determined as the depth value of the one sub-connected domain, the sub-connected domain having the minimum depth value among the plurality of sub-connected domains is determined as the palm connected domain.

Since the human body connected domain is determined as a human body, the palm should be positioned at a forefront of the human body in combination with a scenario where the user makes a gesture. The distance between the palm and the depth camera is the nearest when the user directly faces the depth camera. That is, in this arrangement, the sub-connected domain the nearest to the lens (i.e., having the minimum depth value) among the plurality of sub-connected domains may be determined as the palm connected domain.

In practical applications, when the user makes a gesture, the body of the user does not directly face the depth camera but diagonally faces the depth camera, which leads to an angle between the body and the lens. In this case, the sub-connected domain where the palm is may not be the nearest sub-connected domain. Therefore, in this arrangement, referring to FIG. 8, before the palm connected domain is determined, the human body orientation in the depth image may be acquired (corresponding to Block 801), and then it is determined whether the human body orientation represents a human body depth camera. If yes, the sub-connected domain having the minimum depth value is directly determined as the palm connected domain. If not, the depth value of each of the plurality of sub-connected domains is adjusted (corresponding to Block 802).

Figure 8:
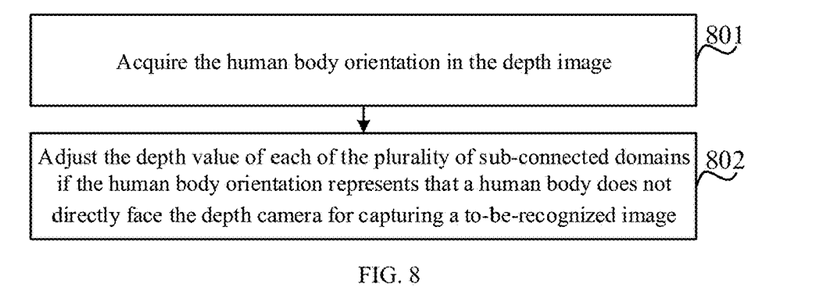
FIG. 8 illustrates a schematic flow diagram of adjusting a depth value of a sub-connected domain according to an arrangement of the present disclosure.

An adjustment algorithm may adopt an algorithm for adjusting the depth value of the connected domain in the related technologies. For example, an image corresponding to the human body connected domain is extracted, a gesture in the image is recognized, and then the gesture of the human body is adjusted to directly face the depth camera. After the gesture of the human body is adjusted to directly face the depth camera, the depth value of each sub-connected domain may be obtained. The distance between each sub-connected domain and the lens may be calculated out mathematically based on the angle between the human body and the lens. Those skilled in the art may choose according to a specific scenario, which is not limited herein.

In Block 102, it is determined that the tracking frame corresponding to the palm connected domain.

In an arrangement, the tracking frame corresponding to the palm connected domain may be determined according to the palm connected domain. For example, a minimum circumscribed rectangular frame of the palm connected domain is acquired, and the minimum circumscribed rectangular frame is determined as the tracking frame corresponding to the palm connected domain. In another arrangement, a rectangular frame may be made using preset side lengths and centering a center position of the palm connected domain, and the rectangular frame serves as the tracking frame corresponding to the palm connected domain. In another arrangement, a circular frame may be made using preset side lengths and taking the center position of the palm connected domain as a center of the circle, and the circular frame serves as the tracking frame corresponding to the palm connected domain. Those skilled in the art may select an appropriate tracking frame according to a specific scenario, which is not limited herein.

In Block 103, a gesture is recognized within a region of a to-be-recognized image corresponding to the tracking frame, based on a location of the tracking frame.

Based on the above description, the relationships between the depth image, the connected domain, the human body connected domain, the sub-connected domain, and the palm connected domain are explained. The depth image is an image acquired by a depth camera provided on an electronic device. A plurality of connected domains are obtained in a depth image by an electronic device using a connected domain algorithm. The human connected domain is obtained by calculating the area of each connected domain and then inputting it into a preset classifier. The sub-connected domain is obtained by subdividing the depth values obtained from the human connected domain. The sub-connected domain with the minimum depth value among a plurality of the sub-connected domains is determined as the palm connected domain.

In this arrangement, the gesture is recognized and tracked within a region of at least one frame of to-be-recognized image corresponding to the tracking frame after determining a color image corresponding to the depth image of the tracking frame, using a preset tracking algorithm and based on a location of the tracking frame. The algorithm for recognizing the gesture or tracking the gesture may be implemented using algorithms in the related technologies, for example, a template matching algorithm, a statistical analysis algorithm, a neural network algorithm, etc., or a kernel correlation filtering (KCF) algorithm, a spatiotemporal context visual tracking algorithm (STC) or an ODFS tracker, etc. An object is tracked through continuous to-be-recognized images. Those skilled in the art may choose according to a specific scenario, which is not limited herein.

In this arrangement, a palm connected domain and a tracking frame corresponding to the palm connected domain are acquired, and then a gesture is recognized within a region of a to-be-recognized image corresponding to the tracking frame. In this way, it is unnecessary to traverse the whole to-be-recognized image, and it is only required to traverse the image within the tracking frame. Therefore, a scope of searching for the gesture is narrowed, data processing amount is reduced, and real-time of gesture recognition is improved.

Figure 9:
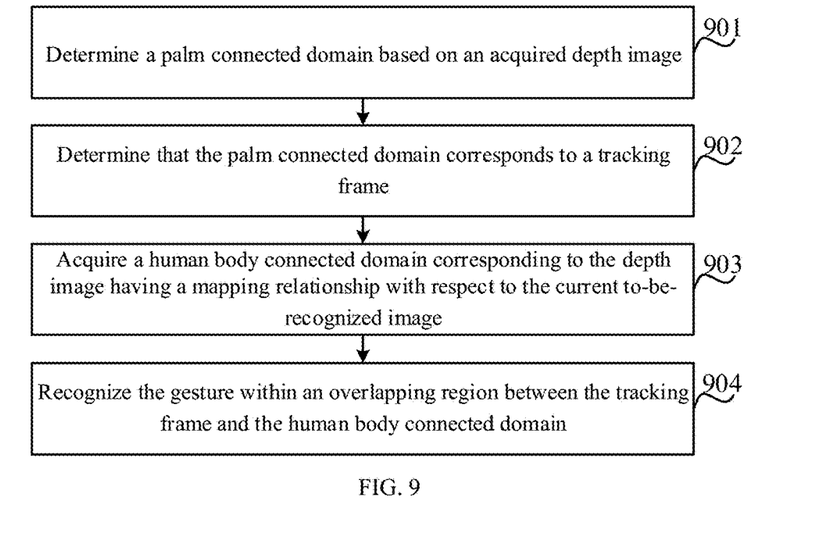
FIG. 9 illustrates a schematic flow diagram of another gesture recognition method according to an arrangement of the present disclosure.

FIG. 9 illustrates a schematic flow diagram of another gesture recognition method according to an arrangement of the present disclosure. Referring to FIG. 9, a gesture recognition method includes Block 901 to Block 904.

In Block 901, a palm connected domain is determined based on an acquired depth image.

Specific methods and principles in Block 901 are consistent with those in Block 101, reference is made to related contents of FIG. 1 and Block 101, and detailed description of the methods and principles in Block 901 is omitted here.

In Block 902, it is determined that the tracking frame corresponding to the palm connected domain.

Specific methods and principles in Block 902 are consistent with those in Block 102, reference is made to related contents of FIG. 1 and Block 102, and detailed description of the methods and principles in Block 901 is omitted here.

In Block 903, it is acquired a human body connected domain corresponding to the depth image having a mapping relationship with respect to the current to-be-recognized image.

Figure 10A:
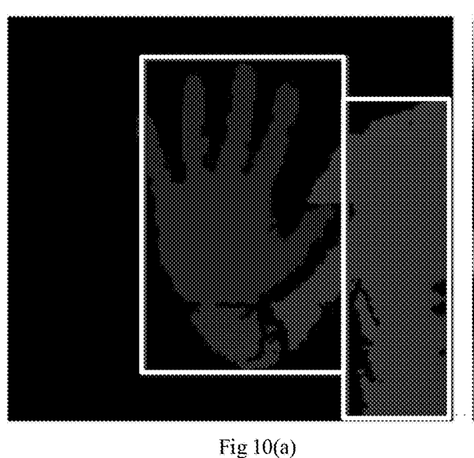
FIG. 10(a) illustrates a schematic effect diagram of a human body connected domain corresponding to a depth image according to an arrangement of the present disclosure.
Figure 10B:
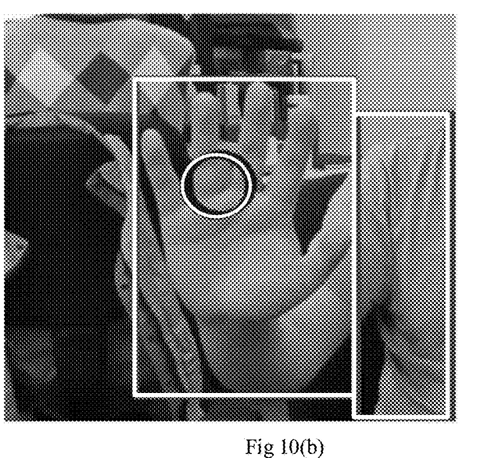
FIG. 10(b) illustrates a schematic effect diagram of a tracking frame corresponding to a to-be-recognized image according to an arrangement of the present disclosure.

In practical applications, in the process of tracking a gesture using algorithms in the related technologies, it is possible to track, by mistake, a background or other parts of the body in the tracking process, which may lead to a consequence that all the subsequent to-be-recognized images are tracked erroneously. Therefore, in this arrangement, the depth image and a mapping relationship between the depth image and the to-be-recognized image are utilized to assist in tracking the gesture. Referring to FIG. 10(a) and FIG. 10(b), wherein FIG. 10(a) shows the depth image, and the rectangular frame represents the acquired human body connected domain; FIG. 10(b) shows the to-be-recognized image captured at the same moment as the depth image, and the rectangular frame represents the tracking frame. That is, the depth image as shown in FIG. 10(a) and the to-be-recognized image as shown in FIG. 10(b) have the mapping relationship.

In the process of tracking the gesture, it is required to process each frame of to-be-recognized image, and the to-be-recognized image in use services as the current to-be-recognized image. In this arrangement, it may be acquired the depth image having a mapping relationship with respect to the current to-be-recognized image, and then a human body connected domain of the depth image may be acquired using the solution in Block 901.

In Block 904, the gesture is recognized within an overlapping region between the tracking frame and the human body connected domain.

In this arrangement, by acquiring the tracking frame corresponding to the to-be-recognized image and the human body connected domain of the depth image having a mapping relationship with respect to this frame of to-be-recognized image, the overlapping region between the tracking frame and the human body connected domain may be acquired, such that the tracking region may be further subdivided, and portions (for example, regions outside the rectangular frame in FIG. 10(b), wherein the circle represents the region where the center position of the palm is) within the region corresponding to the tracking frame and not belonging to the human body connected domain may be eliminated, and thus the overlapping region may be obtained. The area of the overlapping region may be smaller than that of the region corresponding to the tracking frame. Next, the gesture may be tracked within the region corresponding to the overlapping region using a preset tracking algorithm. Reference may be made to contents of Block 103 for the tracking algorithm, and detailed description thereof is omitted here.

Figure 11:
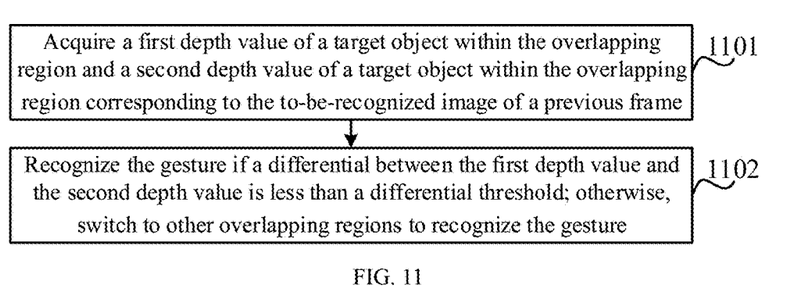
FIG. 11 illustrates a schematic flow diagram of another gesture recognition method according to an arrangement of the present disclosure.

Taking a video stream with a capture frequency of 30 Hz as an example, an interval between two frames of to-be-recognized images is about 30 ms. In the tracking process, the movement of the palm in a z-axis direction (i.e., a depth direction) does not exceed 50 mm (i.e., the differential threshold) within about 30 ms. In addition, when the gesture is in use, a z-axis distance between the palm and the body of the user is greater than 50 mm. Based on this principle, referring to FIG. 11, in the process of tracking the gesture using the tracking algorithm in this arrangement, after a target object that satisfies a detection condition appears, it is required to further determine a depth value (i.e., a first depth value) of the target object and a depth value (i.e., a second depth value) of the target object within the overlapping region corresponding to the previous frame of to-be-recognized image (corresponding to Block 1101). If the first depth value and the second depth value are smaller than the differential threshold (i.e., the depth difference is less than 50 mm), it is determined that the target object is a tracking target, and the gesture is recognized and tracked. If the first depth value and the second depth value exceed the differential threshold (i.e., the depth difference is more than 50 mm), it is determined that the target object is not the tracking target, and other to-be-detected regions are further detected (corresponding to Block 1102). In this way, this arrangement may prevent from erroneously tracking clothes or faces having similar color or gray value in the tracking process, thus enhancing a tracking speed, which may improve the real-time performance of gesture recognition.

In this arrangement, a palm connected domain and a tracking frame corresponding to the palm connected domain are acquired, and then a gesture is recognized within a region of a to-be-recognized image corresponding to the tracking frame. In this way, it is unnecessary to traverse the whole to-be-recognized image, and it is only required to traverse the image within the tracking frame. Therefore, a scope of searching for the gesture is narrowed, data processing amount is reduced, and a real-time performance of gesture recognition is improved. Furthermore, in this arrangement, the region of the tracking frame is further subdivided, such that the tracking region is further narrowed, data processing amount is further reduced, and the real-time performance of gesture recognition is further improved.

Figure 12:
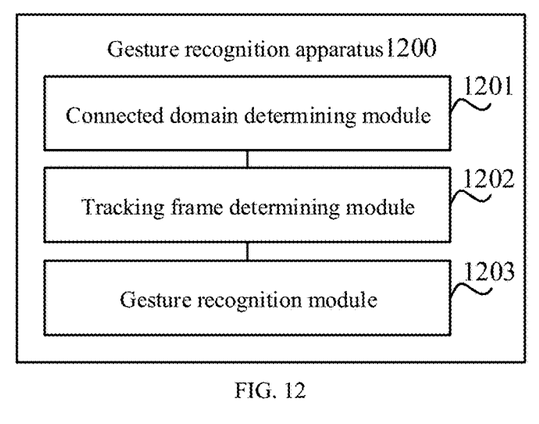
FIG. 12 illustrates a block diagram of a gesture recognition apparatus according to an arrangement of the present disclosure.

FIG. 12 illustrates a block diagram of a gesture recognition apparatus according to an arrangement of the present disclosure. Referring to FIG. 12, a gesture recognition apparatus 1200 includes:

a connected domain determining module 1201, configured to determine a palm connected domain based on an acquired depth image, the connected domain determining module 1201 including a computing chip, which can use a Two-Pass algorithm or a Seed-Filling method to obtain a connected domain determining;

a tracking frame determining module 1202, configured to determine that a tracking frame corresponding to the palm connected domain; the tracking frame determining module 1202 including a setting chip, which can set a frame having certain shape as a tracking frame; and a gesture recognition module 1203, configured to recognize a gesture within a region of a to-be-recognized image corresponding to the tracking frame, based on a location of the tracking frame, the gesture recognition module 1203 including a determining and recognition chip, which can use a template matching algorithm, a statistical analysis algorithm, a neural network algorithm, etc., or a kernel correlation filtering (KCF) algorithm, a spatiotemporal context visual tracking algorithm (STC) or an ODFS tracker to determine and recognize a gesture.

In this arrangement, a palm connected domain and a tracking frame corresponding to the palm connected domain are acquired, and then a gesture is recognized within a region of a to-be-recognized image corresponding to the tracking frame. In this way, it is unnecessary to traverse the whole to-be-recognized image, and it is only required to traverse the image within the tracking frame. Therefore, a scope of searching for the gesture is narrowed, data processing amount is reduced, and a real-time performance of gesture recognition is improved.

Figure 13:
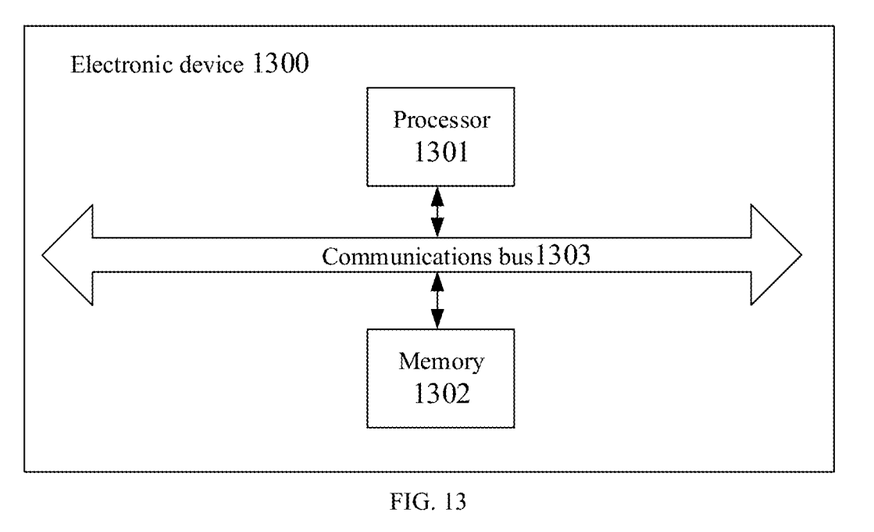
FIG. 13 illustrates a block diagram of an electronic device according to an arrangement of the present disclosure.

FIG. 13 illustrates a block diagram of an electronic device according to an arrangement of the present disclosure. Referring to FIG. 13, the electronic device includes a processor 1301 and a memory 1302 stores processor-executable instructions. The processor 1301 maintains communication with the memory via a communications bus 1303, which can read the instructions from the memory 1302 to implement the blocks of the method as shown in FIG. 2-FIG. 11.

An arrangement of the present disclosure also provides a readable storage medium, which stores computer instructions. When the computer instructions are executed, the blocks of the method as shown in FIG. 2-FIG. 11 are performed. It is to be noted that the readable storage medium may be applied to the electronic device, and those skilled in the art may select according to specific scenarios, which is not limited here.

In the present disclosure, terms "first" and "second" are merely for description purposes, and are not construed as indicating or implying relative importance. Unless otherwise explicitly stated, the term "a plurality of" means two or more than two.

Other arrangements of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and arrangements be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A gesture recognition method comprising:
   determining a palm connected domain based on an acquired depth image;
   determining a tracking frame corresponding to the palm connected domain; and
   recognizing a gesture within a region of a to-be-recognized image corresponding to the tracking frame based on a location of the tracking frame by:
      acquiring a human body connected domain corresponding to the depth image having a mapping relationship with respect to the to-be-recognized image; and
      recognizing the gesture within an overlapping region between the tracking frame and the human body connected domain by:
         acquiring a first depth value of a target object within the overlapping region and a second depth value of a target object within the overlapping region corresponding to the to-be-recognized image of a previous frame; and
         recognizing the gesture if a differential between the first depth value and the second depth value is less than a differential threshold and, otherwise, switching to other overlapping regions to recognize the gesture.

2. The gesture recognition method according to claim 1, wherein determining a palm connected domain based on an acquired depth image comprises:
   determining a human body connected domain based on the acquired depth image, the acquired depth image comprising a plurality of pixels, each of the plurality of pixels corresponding to one depth value, the human body connected domain comprising a plurality of depth values;
   subdividing the plurality of depth values of the human body connected domain into a plurality of depth value groups, subdividing the human body connected domain based on the plurality of depth value groups to obtain a plurality of sub-connected domains, the plurality of sub-connected domains being in one-to-one correspondence with the plurality of depth value groups;
   determining a minimum depth value among depth values corresponding to one of the plurality of sub-connected domains as a depth value of the one of the plurality of sub-connected domains; and
   determining a sub-connected domain having the minimum depth value among the plurality of sub-connected domains as the palm connected domain.

3. The gesture recognition method according to claim 2, wherein determining a human body connected domain based on the depth image comprises:
   acquiring M connected domains in the depth image, where the M is a positive integer, the depth image comprising a plurality of connected domains, each of the plurality of connected domains comprising a plurality of pixels;
   determining a minimum depth value of the plurality of pixels as the depth value of the one sub-connected domain;
   obtaining N connected domains by filtering some of the M connected domains whose depth value is greater than a first preset distance, wherein the N is a positive integer less than or equal to the M;
   calculating, for every connected domain among the N connected domains, an actual area of the connected domain based on a depth value, a width value and a height value of each of the plurality of pixels in the connected domain to obtain P connected domains whose said actual area exceeds a first area threshold and is smaller than a second area threshold, where the P is a positive integer less than or equal to the N; and
   inputting the P connected domains into a preset first classifier to obtain the human body connected domain.

4. The gesture recognition method according to claim 3, wherein the preset first classifier is obtained by converting a sample image photographed when a target object is at different distances from a depth camera into a standard sample image, wherein the sample image is a matrix of human body information at a distance of two meters from the depth camera, or an information matrix obtained by converting other negative samples at a distance of two meters from the depth camera.

5. The gesture recognition method according to claim 3, wherein calculating an actual area of the connected domain based on a depth value, a width value and a height value of each of the plurality of pixels in the connected domain comprises:
   obtaining an actual depth value and an actual height value corresponding to the width value and the height value of the each of the plurality of pixels in the connected domain respectively, based on a preset conversion formula;
   obtaining an actual area of the each of the plurality of pixels in the connected domain based on the actual width value and the actual height value; and
   determining the actual area of the connected domain according to the actual area of the each of the plurality of pixels in the connected domain, based on a preset area formula.

6. The gesture recognition method according to claim 2, wherein subdividing the human body connected domain based on a depth value to obtain a plurality of sub-connected domains comprises:
   selecting a reference pixel from the human body connected domain;
   acquiring a pixel adjacent to the reference pixel which has a differential of the depth value between the pixel and the reference pixel not exceeding a first differential, the pixel and the reference pixel belonging to a same sub-connected domain; and
   by taking the acquired pixel as a new reference pixel, continuing acquiring a pixel belonging to the same sub-connected domain as the new reference pixel; iterating this block until none of the pixels adjacent to the new reference pixels belongs to the same sub-connected domain, to obtain the sub-connected domain.

7. The gesture recognition method according to claim 2, wherein, before determining the sub-connected domain having the minimum depth value among the plurality of sub-connected domains as the palm connected domain, the method further comprises:
   acquiring a human body orientation in the depth image; and
   adjusting the depth value of each of the plurality of sub-connected domains if the human body orientation indicates that the human body does not directly face a depth camera for capturing the to-be-recognized image.

8. The gesture recognition method according to claim 1, wherein determining a tracking frame corresponding to the palm connected domain comprises:
   acquiring a minimum circumscribed rectangular frame of the palm connected domain, and using the minimum circumscribed rectangular frame as the tracking frame corresponding to the palm connected domain.

9. A gesture recognition apparatus, comprising:
   a connected domain determining module configured to determine a palm connected domain based on an acquired depth image;
   a tracking frame determining module configured to determine a tracking frame corresponding to the palm connected domain; and
   a gesture recognition module configured to recognize a gesture within a region of a to-be-recognized image corresponding to the tracking frame based on a location of the tracking frame by:
      acquiring a human body connected domain corresponding to the depth image having a mapping relationship with respect to the to-be-recognized image; and
      recognizing the gesture within an overlapping region between the tracking frame and the human body connected domain by:
         acquiring a first depth value of a target object within the overlapping region and a second depth value of a target object within the overlapping region corresponding to the to-be-recognized image of a previous frame; and
         recognizing the gesture if a differential between the first depth value and the second depth value is less than a differential threshold and, otherwise, switching to other overlapping regions to recognize the gesture.

10. An electronic device, comprising:
    at least one hardware processor; and
    program instructions stored in memory and executable by the at least one hardware processor that, when executed, direct the at least one hardware processor to:
    determine a palm connected domain based on an acquired depth image;
    determine a tracking frame corresponding to the palm connected domain; and
    recognize a gesture within a region of a to-be-recognized image corresponding to the tracking frame based on a location of the tracking frame by:
       acquiring a human body connected domain corresponding to the depth image having a mapping relationship with respect to the to-be-recognized image; and
       recognizing the gesture within an overlapping region between the tracking frame and the human body connected domain by:
          acquiring a first depth value of a target object within the overlapping region and a second depth value of a target object within the overlapping region corresponding to the to-be-recognized image of a previous frame; and
          recognizing the gesture if a differential between the first depth value and the second depth value is less than a differential threshold and, otherwise, switching to other overlapping regions to recognize the gesture.

11. The electronic device according to claim 10, wherein determining a palm connected domain based on an acquired depth image comprises:
    determining a human body connected domain based on the depth image, the depth image comprising a plurality of pixels, each of the plurality of pixels corresponding to one depth value, the human body connected domain comprising a plurality of depth values;
    subdividing the plurality of depth values of the human body connected domain into a plurality of depth value groups;
    subdividing the human body connected domain based on the plurality of depth value groups to obtain a plurality of sub-connected domains, the plurality of sub-connected domains being in one-to-one correspondence with the plurality of depth value groups;
    determining a minimum depth value among depth values corresponding to one of the plurality of sub-connected domain as a depth value of the one of the plurality of sub-connected domain; and
    determining a sub-connected domain having the minimum depth value among the plurality of sub-connected domains as the palm connected domain.

12. The electronic device according to claim 11, wherein determining a human body connected domain based on the depth image comprises:

acquiring M connected domains in the depth image, where the M is a positive integer, the depth image comprising a plurality of connected domains, each of the plurality of connected domains comprising a plurality of pixels;

determining a minimum depth value of the plurality of pixels as the depth value of the one sub-connected domain;

obtaining N connected domains by filtering some of the M connected domains whose depth value is greater than a first preset distance, wherein the N is a positive integer less than or equal to the M;

calculating, for every connected domain among the N connected domains, an actual area of the connected domain based on a depth value, a width value and a height value of each of the plurality of pixels in the connected domain to obtain P connected domains whose said actual area exceeds a first area threshold and is smaller than a second area threshold, where the P is a positive integer less than or equal to the N; and inputting the P connected domains into a preset first classifier to obtain the human body connected domain.

13. The electronic device according to claim 12, wherein the first classifier is obtained by converting a sample image photographed when a target object is at different distances from a depth camera into a standard sample image, wherein the sample image is a matrix of human body information at a distance of two meters from the depth camera, or an information matrix obtained by converting other negative samples at a distance of two meters from the depth camera.

14. The gesture recognition method according to claim 12, wherein calculating an actual area of the connected domain based on a depth value, a width value and a height value of each of the plurality of pixels in the connected domain comprises:

obtaining an actual width value and an actual height value corresponding to the width value and the height value of the each of the plurality of pixels in the connected domain respectively, based on a preset conversion formula;

obtaining an actual area of the each of the plurality of pixels in the connected domain based on the actual width value and the actual height value; and determining the actual area of the connected domain according to the actual area of the each of the plurality of pixels in the connected domain, based on a preset area formula.

15. A non-transitory computer-readable storage medium storing computer instructions, wherein the method according to claim 1 is implemented when the computer instructions are executed by at least one hardware processor.

16. The non-transitory computer-readable storage medium according to claim 15, wherein determining a palm connected domain based on an acquired depth image comprises:

determining a human body connected domain based on the depth image, the depth image comprising a plurality of pixels, each of the plurality of pixels corresponding to one depth value, the human body connected domain comprising a plurality of depth values;

subdividing the plurality of depth values of the human body connected domain into a plurality of depth value groups;

subdividing the human body connected domain based on the plurality of depth value groups to obtain a plurality of sub-connected domains, the plurality of sub-connected domains being in one-to-one correspondence with the plurality of depth value groups;

determining a minimum depth value among depth values corresponding to one of the plurality of sub-connected domains as a depth value of the one of the plurality of sub-connected domains; and determining a sub-connected domain having the minimum depth value among the plurality of sub-connected domains as the palm connected domain.

17. The non-transitory computer-readable storage medium according to claim 16, wherein determining a human body connected domain based on the depth image comprises:

acquiring M connected domains in the depth image, where the M is a positive integer, the depth image comprising a plurality of connected domains, each of the plurality of the connected domains comprising a plurality of pixels;

determining a minimum depth value of the plurality of pixels as the depth value of the one sub-connected domain;

obtaining N connected domains by filtering some of the M connected domains whose depth value is greater than a first preset distance, wherein the N is a positive integer less than or equal to the M;

calculating, for every connected domain among the N connected domains, an actual area of the connected domain based on a depth value and a height value of each of the plurality of pixels in the connected domain to obtain P connected domains whose said actual area exceeds a first area threshold and is smaller than a second area threshold, where the P is a positive integer less than or equal to the N; and inputting the P connected domains into a preset first classifier to obtain the human body connected domain.

18. The non-transitory computer-readable storage medium according to claim 17, wherein the first classifier is obtained by converting a sample image photographed when a target object is at different distances from a depth camera into a standard sample image; and the sample image is a matrix of human body information at a distance of two meters from the depth camera, or an information matrix obtained by converting other negative samples at a distance of two meters from the depth camera.

* * * * *